US012612938B2

(12) United States Patent
Song

(10) Patent No.: US 12,612,938 B2
(45) Date of Patent: Apr. 28, 2026

(54) INTERMEDIATE SHAFT

(71) Applicant: HL Mando Corporation, Pyeongtaek-si (KR)

(72) Inventor: Sangyoun Song, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 514 days.

(21) Appl. No.: 18/100,373

(22) Filed: Jan. 23, 2023

(65) Prior Publication Data

US 2023/0235778 A1 Jul. 27, 2023

(30) Foreign Application Priority Data

Jan. 24, 2022 (KR) ........................ 10-2022-0009752

(51) Int. Cl.
*F16C 3/03* (2006.01)
*B62D 1/19* (2006.01)

(52) U.S. Cl.
CPC ................ *F16C 3/03* (2013.01); *B62D 1/192* (2013.01); *F16C 2226/12* (2013.01); *F16C 2300/20* (2013.01)

(58) Field of Classification Search
CPC .... F16C 3/03; F16C 2226/12; F16C 2300/20; B62D 1/192
USPC ......................................... 280/777; 464/162
See application file for complete search history.

(56) References Cited

U.S. PATENT DOCUMENTS

| | | | | |
|---|---|---|---|---|
| 6,099,036 A | * | 8/2000 | Fujiu | F16C 3/03 |
| | | | | 280/777 |
| 7,975,569 B2 | * | 7/2011 | Klos | B62D 1/192 |
| | | | | 280/777 |
| 11,022,181 B2 | * | 6/2021 | Kim | F16D 3/065 |
| 2018/0347635 A1 | * | 12/2018 | Kim | B62D 1/20 |

FOREIGN PATENT DOCUMENTS

KR 10-2009-0071917 A 7/2009

OTHER PUBLICATIONS

Office Action issued on Oct. 16, 2025 for corresponding Korean Patent Application No. 10-2022-0009752 (10 pages).

* cited by examiner

*Primary Examiner* — Greg Binda
(74) *Attorney, Agent, or Firm* — Hauptman Ham, LLP

(57) ABSTRACT

An intermediate shaft includes a first hollow shaft portion in which a plurality of grooves are formed in a longitudinal direction thereof, a second hollow shaft portion coupled at one end thereof to a first slip member, provided to be accommodated inside the first hollow shaft portion, and slipped into the first hollow shaft portion when a collision occurs, and a shaft portion to which a second slip member is coupled, provided to be accommodated inside the second hollow shaft portion, and slipped into the second hollow shaft portion when the collision occurs. A first press-in portion is formed on an inner circumference of the first hollow shaft portion to protrude therefrom, thereby pressing and supporting the first slip member.

6 Claims, 7 Drawing Sheets

INTERMEDIATE SHAFT

CROSS-REFERENCE TO RELATED APPLICATIONS

This application claims a benefit under 35 U.S.C § 119(a) of Korean Patent Application No. 10-2022-0009752 filed on Jan. 24, 2022 on the Korean Intellectual Property Office, the entire disclosure of which is incorporated herein by reference for all purposes.

TECHNICAL FIELD

The present disclosure relates to an intermediate shaft.

BACKGROUND

Generally, an intermediate shaft transmits power and absorbs shocks by connecting a steering column and a steering gear. Recently, as a vehicle becomes larger and has higher performance, a longer intermediate shaft is required compared to the prior art.

This is because a distance between the steering column and the steering gear is relatively long in a large-sized passenger car with a long bonnet, a high-performance vehicle, or a large truck.

A conventional intermediate shaft includes a hollow first shaft, a second shaft inserted into the first shaft by a predetermined length, a first universal joint installed at an outer end of the first shaft, and a second universal joint coupled to an outer end of the second shaft.

A structure in which the second shaft may slide into the first shaft to absorb shock in the event of a vehicle collision is required, a groove having a predetermined length is formed inside the first shaft, and a rolling ball which engages with the groove of the first shaft and is slidable is further provided on the outside of the second shaft.

Although such a structure may be applied to a large-sized or high-performance vehicle by extending only the length of the existing intermediate shaft, there is a problem in that the stability of power transmission is lowered and a collapse stroke is not sufficiently secured in the event of an accident.

Further, there is a problem in that the shaft is removed when a collision occurs or when an abnormal operation occurs.

SUMMARY

Accordingly, the present disclosure has been made keeping in mind the above problems occurring in the related art, and an objective of the present disclosure is to provide an intermediate shaft which can secure a sufficient collapse stroke in the event of a collision, and prevent the removal of the shaft.

The present disclosure provides an intermediate shaft including a first hollow shaft portion in which a plurality of grooves are formed in a longitudinal direction thereof, a second hollow shaft portion coupled at one end thereof to a first slip member, provided to be accommodated inside the first hollow shaft portion, and slipped into the first hollow shaft portion when a collision occurs, and a shaft portion to which a second slip member is coupled, provided to be accommodated inside the second hollow shaft portion, and slipped into the second hollow shaft portion when the collision occurs, wherein a first press-in portion may be formed on an inner circumference of the first hollow shaft portion to protrude therefrom, thereby pressing and supporting the first slip member.

Preferably, the first press-in portion may be formed at a first position of the first hollow shaft portion corresponding to an initial position of the first slip member.

Preferably, the first press-in portion may be formed to press each of portions which are spaced apart from each other in an axial direction of the first slip member.

Preferably, the first slip member may be formed along an inner circumference of the first hollow shaft portion to be spaced apart therefrom by a predetermined distance.

Preferably, the first press-in portion may provide a resistance force to the first slip member against an impact force.

Preferably, a second press-in portion may be formed on an inner circumference of an end of the first hollow shaft portion to prevent removal of the first slip member.

More preferably, a height of the second press-in portion may be formed to be higher than a height of the first press-in portion.

Advantageous Effects

In an intermediate shaft according to various embodiments of the present disclosure, a sliding movement is performed between a shaft portion and a second hollow shaft portion and between the second hollow shaft portion and a first hollow shaft portion, respectively, in the event of a collision accident so that a shaft length can be rapidly reduced, thereby improving a collapse stroke, and increasing shock absorption efficiency while improving a minimum collapse load through a first press-in portion to ensure safety.

Further, a second press-in portion is formed, so that the removal of a second hollow shaft portion can be prevented when a collision occurs or when an abnormal operation occurs.

DETAILED DESCRIPTION

Figure 1:
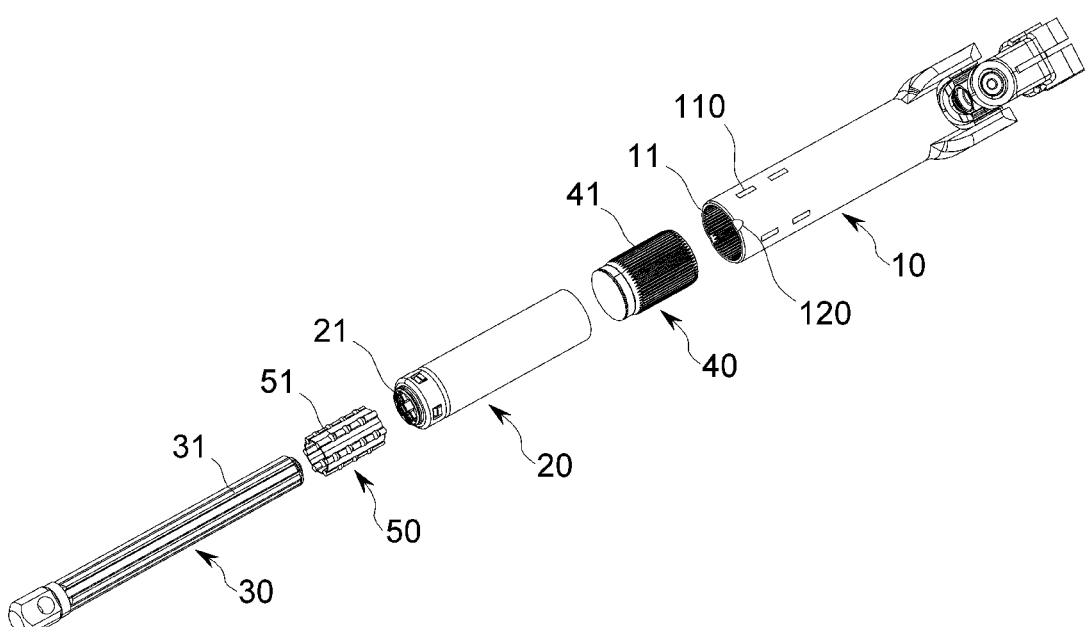
FIG. 1 is an exploded perspective view of an intermediate shaft according to a preferred embodiment of the present disclosure.

Hereinafter, for the convenience of description, some embodiments of the present disclosure will be described with reference to the accompanying drawings. The same reference numerals are used throughout the drawings to designate the same or similar components.

The terminologies or words used in the specification and the claims should not be limited to common and dictionary meanings, but should be interpreted as having meanings and concepts which are defined within the scope of the present disclosure, as long as the inventor(s) can appropriately define the concepts of terminologies so as to explain the invention in the best way. Further, it will be understood that, although the terms "first", "second", "A", "B", "(a)", "(b)", etc. may be used herein to describe various elements, these elements should not be limited by these terms. These terms are only used to distinguish one element from another element. It will be understood that when an element is referred to as being "coupled" or "connected" to another element, it can be directly coupled or connected to the other element or intervening elements may be present therebetween.

Therefore, it is to be understood that the present description is not intended to limit the present disclosure to those exemplary embodiments, and the present disclosure is intended to cover not only the exemplary embodiments, but also various alternatives, modifications, equivalents and other embodiments that fall within the spirit and scope of the present disclosure. Further, the detailed descriptions of well-known functions and configurations that may unnecessarily obscure the subject matter of the present disclosure are omitted.

Hereinafter, an intermediate shaft according to various embodiments of the present disclosure will be described in detail with reference to the accompanying drawings.

Figure 2:
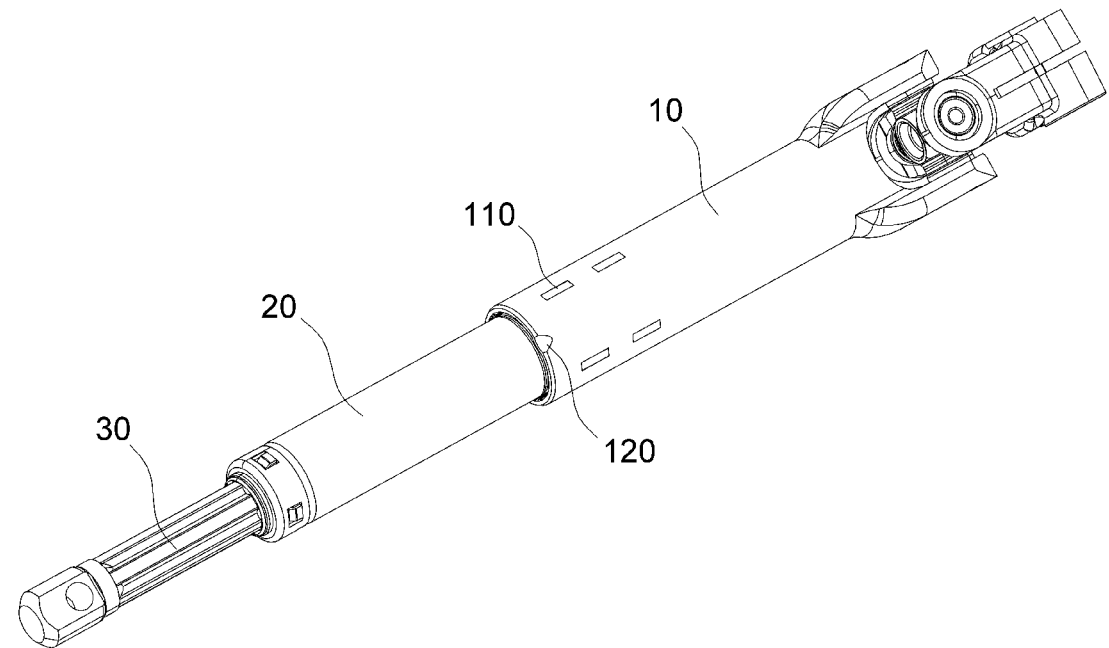
FIG. 2 is a perspective view of the intermediate shaft according to a preferred embodiment of the present disclosure.
Figure 3:
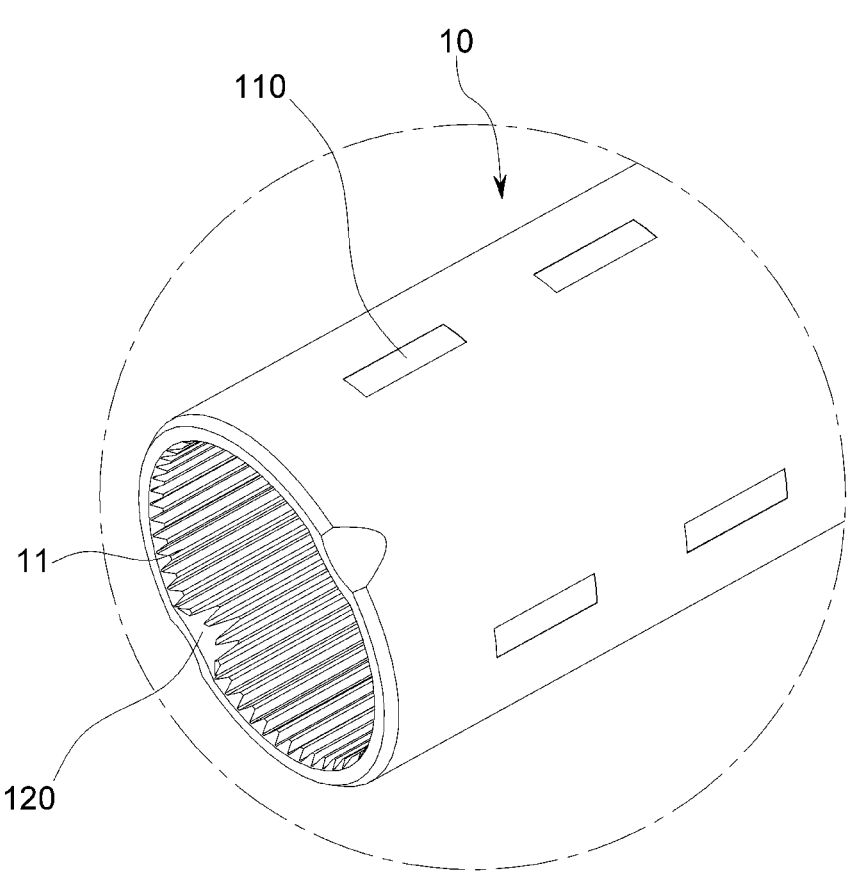
FIG. 3 is a partially enlarged perspective view illustrating a first press-in portion and a second press-in portion formed on a first hollow shaft portion of FIG. 1.
Figure 4:
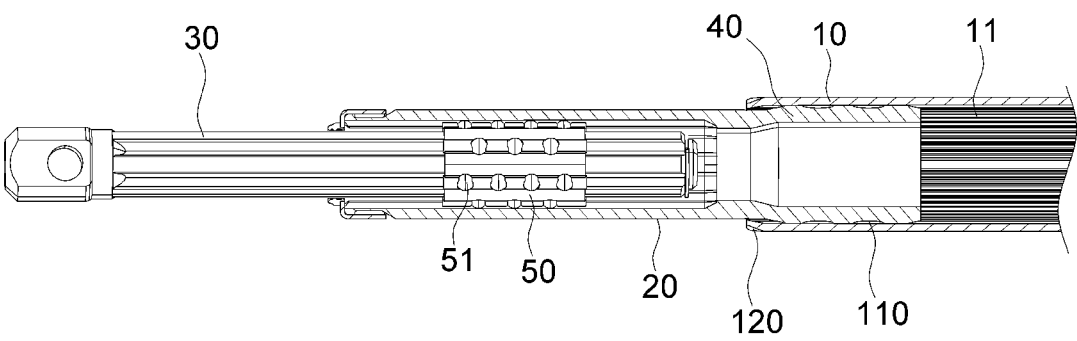
FIG. 4 is a sectional view illustrating an initial state in which a collapse occurs between a shaft portion and the first hollow shaft portion in the intermediate shaft according to a preferred embodiment of the present disclosure.
Figure 5:
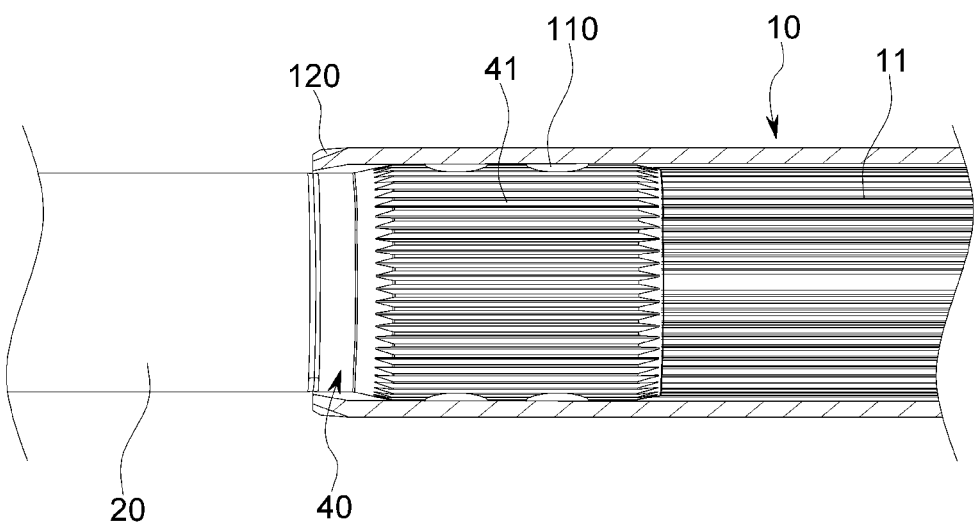
FIG. 5 is an enlarged sectional view illustrating a state in which a first slip member is pressed and supported by a first press-in portion in an initial position of FIG. 4.
Figure 6:
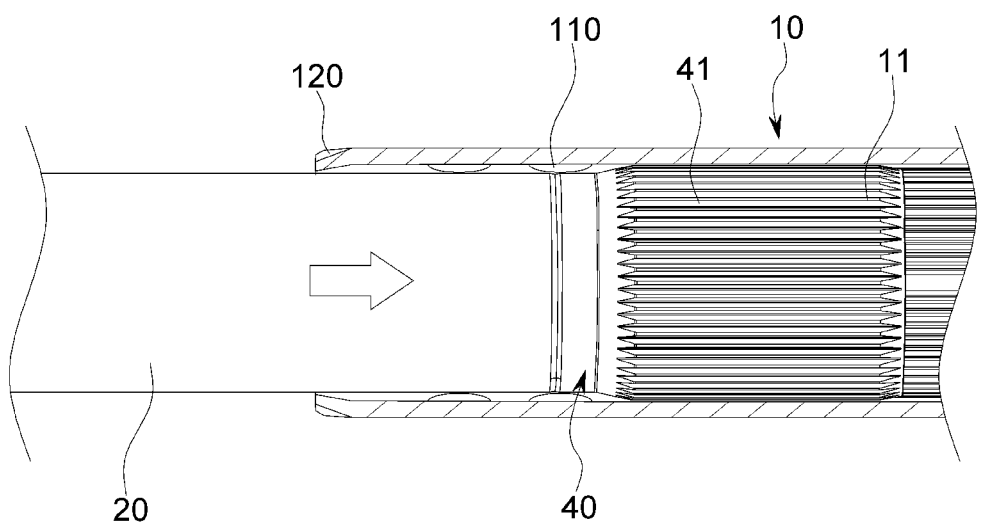
FIG. 6 is an enlarged sectional view illustrating a state in which the first slip member slips into the first hollow shaft portion in FIG. 5.
Figure 7:
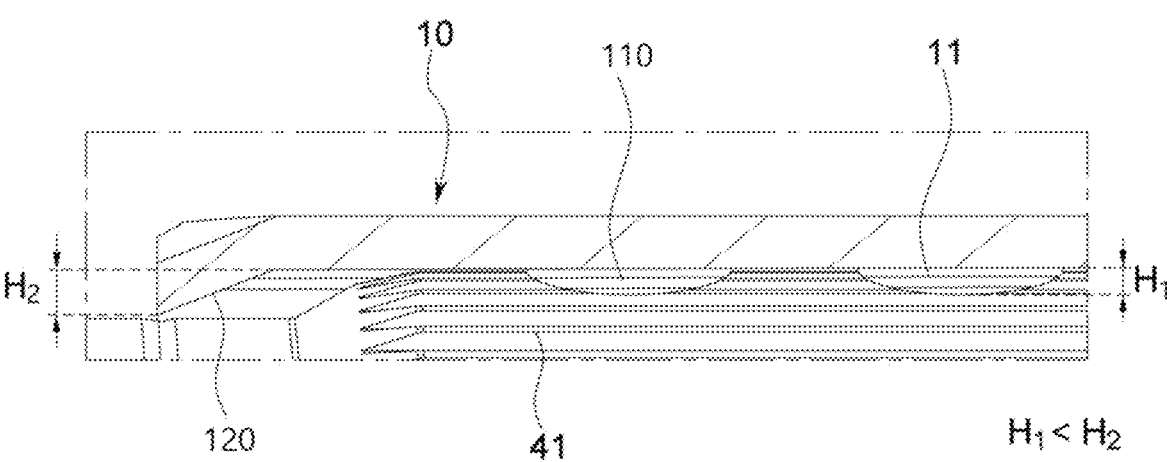
FIG. 7 is a partial sectional view illustrating the relative height of the first press-in portion and the second press-in portion according to an embodiment of the present disclosure.

FIG. 1 is an exploded perspective view of an intermediate shaft according to a preferred embodiment of the present disclosure, FIG. 2 is a perspective view of the intermediate shaft according to a preferred embodiment of the present disclosure, FIG. 3 is a partially enlarged perspective view illustrating a first press-in portion and a second press-in portion formed on a first hollow shaft portion of FIG. 1, FIG. 4 is a sectional view illustrating an initial state in which a collapse occurs between a shaft portion and the first hollow shaft portion in the intermediate shaft according to a preferred embodiment of the present disclosure, FIG. 5 is an enlarged sectional view illustrating a state in which a first slip member is pressed and supported by a first press-in portion in an initial position of FIG. 4, FIG. 6 is an enlarged sectional view illustrating a state in which the first slip member slips into the first hollow shaft portion in FIG. 5, and FIG. 7 is a partial sectional view illustrating the relative height of the first press-in portion and the second press-in portion according to an embodiment of the present disclosure.

Referring to FIGS. 1 to 7, the intermediate shaft according to various embodiments of the present disclosure may include a first hollow shaft portion 10, a second hollow shaft portion, and a shaft portion.

The first hollow shaft portion 10 may be formed in the shape of a hollow pipe. A joint, such as a universal joint, may be coupled to one end of the first hollow shaft portion 10. The other end of the first hollow shaft portion 10 may be opened to communicate with the hollow portion, and may accommodate at least a portion of the second hollow shaft portion 20.

A plurality of grooves 11 is formed in a longitudinal direction on the inner circumference of the hollow portion of the first hollow shaft portion 10. The grooves 11 are configured to transmit a rotating force between the first hollow shaft portion 10 and the second hollow shaft portion 20, and to absorb shock while the second hollow shaft portion 20 is inserted into the first hollow shaft portion 10 along a direction in which the grooves 11 are formed in the event of a collision. The groove 11 may match with a protrusion 41 formed on the first slip member 40 which is coupled to one end of the second hollow shaft portion.

A first press-in portion 110 may be formed on a side of an inner circumference of the first hollow shaft portion 10 to protrude inwards in a radial direction, thereby pressing the first slip member 40. The first press-in portion 110 may provide a resistance force to the first slip member 40 against an impact force. As shown in FIG. 5, the first press-in portion 110 may be formed at a position of the first hollow shaft portion 10 corresponding to the initial position of the first slip member 40. The initial position of the first slip member 40 may mean a position before slip movement due to a collision. The first press-in portion 110 may be formed to protrude inwards in the radial direction from the inner circumference of the first hollow shaft portion 10 by a first height H1.

In an exemplary embodiment, first press-in portions 110 may be formed to be separated in an axial direction, thereby pressing portions spaced apart from each other in the axial direction of the first slip member 40. The first slip member 40 may be formed along the inner circumference of the first hollow shaft portion 10 to be spaced apart therefrom by a predetermined distance.

In another embodiment, the first press-in portion 110 may be formed in the shape of a ring to continuously press the circumference of the first slip member 40. However, the shape of the first press-in portion 110 is not limited to the above-described example. It is apparent that the first press-in portion may be formed in any shape as long as it may press the outer circumference of the first slip member 40 to provide a pressing force.

The grooves 11 formed on the inner circumference of the first hollow shaft portion 10 may be continuously formed on the first press-in portion 110. This provides a resistance force to the first slip member 40 through the first press-in portion 110, and enables the first slip member 40 to perform a shock absorbing operation while continuously slipping along the grooves 11, when the impact force exceeding the resistance force is applied.

According to an exemplary embodiment, in order for the first press-in portion 110 to provide a sufficient pressing force to the first slip member 40, the protrusion 41 of the first slip member 40 may loosely engage with the groove 11 of the first hollow shaft portion 10 to form a certain gap therebetween.

In an exemplary embodiment, the first press-in portion 110 may be formed by press-processing the outer diameter of the first hollow shaft portion 10. At this time, it is preferable that the first press-in portion 110 be previously formed before the first slip member 40 is coupled to the first hollow shaft portion 10. This is because the maximum collapse load of the first press-in portion 110 may be predicted, by measuring a pressing force of the first press-in portion 110 acting on the first slip member 40 in the process of inserting the first slip member 40 into the hollow portion of the first hollow shaft portion 10.

A second press-in portion 120 may be formed on the inner circumference of the first hollow shaft portion 10 to protrude inwards in the radial direction, thereby preventing the removal of the first slip member 40. As shown in FIG. 7, the second press-in portion 120 may be formed to protrude by a second height H2 which is higher than the first height H1 of the first press-in portion 110.

In an embodiment, the second press-in portion 120 may be formed on the other end in a longitudinal direction of the first hollow shaft portion 10. The second press-in portion may contact the protrusion 41 of the first slip member 40, thus preventing the first slip member 40 from being dislodged outward from the hollow portion of the first hollow shaft portion 10.

In another embodiment, the second press-in portion 120 may be spaced apart from the other end of the first hollow shaft portion 10 to be formed between the other end of the first hollow shaft portion 10 and the first press-in portion 110. The forming position of the second press-in portion 120 may be set differently according to the initial position of the first slip member 40.

A plurality of second press-in portions 120 may be formed along the inner circumference of the first hollow shaft portion 10 to be spaced apart from each other.

In an exemplary embodiment, the second press-in portion 120 may be formed by press-processing the outer diameter of the first hollow shaft portion 10, after the first slip member 40 is inserted into the hollow portion of the first hollow shaft portion 10. This is for the convenience of assembly in the manufacturing process.

Referring to FIGS. 4 and 5, even if a collision occurs, slip occurs through the second slip member 50 before the impact force reaches a certain magnitude, so that shock is primarily absorbed while the shaft portion is accommodated in the second hollow shaft portion. For this reason, the first slip member 40 may be still maintained in the initial position. This is because the pressing force of the first press-in portion 110 acts as the resistance force resisting the impact force generated during a collision.

Referring to FIG. 6, the first slip member 40 may slip and move into the first hollow shaft portion 10 only when the impact force generated during a collision exceeds the resistance force provided by the first press-in portion 110. This is because the pressing force of the first press-in portion 110 acts as the resistance force resisting the impact force generated during a collision in the initial position. Here, the impact force for starting the slip movement of the first slip member 40 may be described as a maximum resistance load. The resistance force (pressing force) provided by the first press-in portion 110 may be controlled by changing the design value of an area and the height of the first press-in portion 110 protruding from the inner circumference of the first hollow shaft portion 10.

The first slip member 40 may be coupled to one end of the second hollow shaft portion 20. The protrusion 41 is formed on the outer surface of the first slip member 40 to engage with the groove 11. The first slip member 40 is coupled to the outer diameter of one end of the second hollow shaft portion 20, and transmits a rotating force between the first hollow shaft portion 10 and the second hollow shaft portion 20 so that no slip occurs.

One end of the shaft portion 30 to which the second slip member 50 is coupled may be inserted into the second hollow shaft portion 20. A plurality of grooves 21 is provided on the inner diameter of the second hollow shaft portion 20 to extend in a longitudinal direction thereof, and balls 51 of the second slip member 50 are located in the grooves 21.

A rotating force between the second hollow shaft portion 20 and the shaft portion 30 may be transmitted by the coupling of the balls 51 and the grooves 21. Further, when a collision occurs, shock may be relieved while the shaft portion 30 is inserted into the second hollow shaft portion 20. As such, when only the impact force smaller than the maximum collapse load is applied, rapid slip is achieved due to the rolling properties of the balls 51 provided in the second slip member 50 when the shaft portion 30 is inserted into the second hollow shaft portion 20, so that shock can be absorbed while the shaft portion 30 moves into the second hollow shaft portion 20.

Thus, the present disclosure includes three portions, i.e. the first hollow shaft portion 10, the second hollow shaft portion 20, and the shaft portion 30, thus providing a structure which is easy to apply to a large-sized vehicle with a large bonnet or a high-performance vehicle.

Further, collapse occurs between the first hollow shaft portion 10 and the second hollow shaft portion 20 and between the second hollow shaft portion 20 and the shaft portion 30 in the event of a collision, thus providing a sufficient collapse stroke and thereby enhancing shock absorbing effect.

In addition, according to the present disclosure, the first slip member 40 is applied between the first hollow shaft portion 10 and the second hollow shaft portion 20, and the ball slip member 50 is applied between the second hollow shaft portion 20 and the shaft portion 30, thus making a difference in the impact force at which slip occurs.

Turning back to FIG. 4, the second slip member 50 is configured such that the balls 51 having the rolling properties contact the inner surface of the second hollow shaft portion 20, and may be slipped even by a relatively weaker impact force compared to the first slip member 40 which is fitted such that the protrusions and the grooves engage with each other.

That is, in the initial state where a weak impact force or a strong impact force is applied, the second slip member 50 slips and the shaft portion 30 slidably moves into the second hollow shaft portion 20, so that shock absorbing effect can be achieved.

At this time, as shown in FIG. 5, the first slip member 40 may be maintained in the initial position.

When a relatively strong force exceeding the pressing force of the first press-in portion 110 is applied as shown in FIG. 6, the shaft portion 30 may be first slipped and inserted into the second hollow shaft portion 20 due to the rolling properties of the balls 51 of the second slip member 50 as shown in FIG. 4, and then the second hollow shaft portion 20 which is coupled at the outer surface of one end thereof to the first slip member 40 may be slipped and inserted into the first hollow shaft portion 10.

As such, the present disclosure enables both a shock absorbing operation of a relatively weak impact force and a shock absorbing operation of a relatively strong impact force by using slip portions of different structures having different resistance forces corresponding to the impact force.

Further, the first slip member 40 may be pressed and supported in the initial position through the first press-in portion 110 to prevent additional collapse from occurring between the first hollow shaft portion 10 and the second hollow shaft portion 20 before the impact force exceeding the maximum collapse load is applied, thus guaranteeing minimum driver safety. Furthermore, the maximum collapse load can be controlled by adjusting the height and/or area of the first press-in portion 110.

Moreover, the second press-in portion 120 can prevent the second hollow shaft portion 20 from being removed from the first hollow shaft portion 10 when a collision occurs or when an abnormal operation occurs.

Although all components constituting an embodiment of the present disclosure are described as being combined or operated as one, the present disclosure is not necessarily limited to these embodiments. That is, within the scope of the present disclosure, all of the components may be selectively combined and operated. Further, it should be understood that terms such as "comprise", "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added, unless otherwise stated. Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

| [Detailed Description of Main Elements] | |
| --- | --- |
| 10: first hollow shaft portion | 11, 21: groove |
| 20: second hollow shaft portion | 30: shaft portion |
| 40: first slip member | 41: protrusion |

-continued

| [Detailed Description of Main Elements] | |
| --- | --- |
| 50: second slip member | 51: ball |
| 110: first press-in portion | 120: second press-in portion |

What is claimed is:

1. An intermediate shaft comprising:
a first hollow shaft portion in which a plurality of grooves is formed in a longitudinal direction thereof;
a second hollow shaft portion coupled at one end thereof to a first slip member, provided to be accommodated inside the first hollow shaft portion, and slipped into the first hollow shaft portion when a collision occurs; and
a shaft portion to which a second slip member is coupled, provided to be accommodated inside the second hollow shaft portion, and slipped into the second hollow shaft portion when the collision occurs,
wherein a first press-in portion is formed on an inner circumference of the first hollow shaft portion to protrude therefrom, thereby pressing and supporting the first slip member, and
wherein the first press-in portion is formed at a first position of the first hollow shaft portion corresponding to an initial position of the first slip member.

2. The intermediate shaft of claim 1, wherein the first press-in portion is formed to press each of portions which are spaced apart from each other in an axial direction of the first slip member.

3. The intermediate shaft of claim 1, wherein the first slip member comprises a plurality of protrusions arranged along an inner circumference of the first hollow shaft portion to be spaced apart therefrom from each other by a predetermined distance, in a state where the first slip member is accommodated inside the first hollow shaft portion.

4. The intermediate shaft of claim 1, wherein the first press-in portion provides a resistance force to the first slip member against an impact force.

5. The intermediate shaft of claim 1, wherein a second press-in portion is formed on an inner circumference of one end of the first hollow shaft portion to prevent removal of the first slip member.

6. The intermediate shaft of claim 5, wherein a height of the second press-in portion is formed to be higher than a height of the first press-in portion.

* * * * *